United States Patent
Portaluri et al.

(10) Patent No.: US 6,392,375 B1
(45) Date of Patent: May 21, 2002

(54) METHOD OF DRIVING WITH HIGH PRECISION A VOICE COIL MOTOR AND RELATED ARCHITECTURE

(75) Inventors: Salvatore Portaluri; Alessandro Savo, both of Pavia; Luigi Eugenio Garbelli, Mapello; Giuseppe Luciano, Brugherio; Luca Schillaci, Pavia, all of (IT)

(73) Assignee: StMicroelectronics S.R.L., Agrate Brianza (IT)

( * ) Notice: Subject to any disclaimer, the term of this patent is extended or adjusted under 35 U.S.C. 154(b) by 0 days.

(21) Appl. No.: 09/542,101

(22) Filed: Apr. 4, 2000

(51) Int. Cl.[7] .................................................. H02P 1/00
(52) U.S. Cl. ...................... 318/459; 318/254; 360/78.06
(58) Field of Search ................................ 318/459, 254, 318/439; 360/78.06, 75, 264.7

(56) References Cited

U.S. PATENT DOCUMENTS

| | | | | |
|---|---|---|---|---|
| 5,384,524 A | * | 1/1995 | Romano | 318/569 |
| 5,504,402 A | * | 4/1996 | Menegoli | 318/377 |
| 5,615,064 A | * | 3/1997 | Blank et al. | 360/75 |
| 5,621,288 A | * | 4/1997 | Seki et al. | 318/431 |
| 5,844,743 A | * | 12/1998 | Funches | 360/78.04 |
| 6,034,496 A | * | 3/2000 | Male | 318/439 |
| 6,081,112 A | * | 6/2000 | Carobolante et al. | 324/177 |
| 6,134,071 A | * | 10/2000 | Andoh et al. | 360/75 |
| 6,222,336 B1 | * | 5/2001 | McKenzie et al. | 318/448 |
| 6,229,663 B1 | * | 5/2001 | Yoneda et al. | 360/75 |

* cited by examiner

*Primary Examiner*—Robert E. Nappi
*Assistant Examiner*—Rina I. Duda
(74) *Attorney, Agent, or Firm*—Lisa K. Jorgenson; Allen, Dyer, Doppelt, Milbrath & Gilchrist, P.A.

(57) ABSTRACT

The method is for controlling a voice coil motor which drives a mechanical arm via a control circuit which sets the output nodes, to which the motor is connected, in a high impedance state for a certain time interval. The method and circuit detect the back electromotive force induced on the motor winding during the time interval, and deliver current pulses for driving the motor. The circuit compares the detected back electromotive force with a certain target value and regulates the amplitude of the driving current pulses as a function of the difference between the detected value of the back electromotive force and a voltage signal representing the desired speed of the arm, according to a pre-established function. A preferred embodiment includes such a function being a pre-established saturated linear characteristic with an offset value.

22 Claims, 4 Drawing Sheets

METHOD OF DRIVING WITH HIGH PRECISION A VOICE COIL MOTOR AND RELATED ARCHITECTURE

FIELD OF THE INVENTION

The present invention relates to electromagnetic actuators, and, more particularly, to control of a Voice Coil Motor (VCM).

BACKGROUND OF THE INVENTION

Voice coil motors are used in several applications and in particular in Hard Disk Drive systems (HDD) to load or unload a read/write head onto the disk. When the disk is stopped, it is necessary to drive the mechanic arm supporting the read/write head in a safe position away from the disk, in order to reduce the possibility that vibrations of the head, during its non-operative time, will damage the disk. Such an operation is called "ramp unloading". The inverse operation ("ramp loading") must be carried out when the HDD is turned on to read/write data stored in the disk.

During the ramp loading or unloading, the speed of the arm can be controlled by varying the mean voltage applied in a PWM period to the voice coil motor. Excessive voltages must be avoided because they could overdrive the read/write head, and damage it. To avoid such a problem, it is necessary to regulate the speed of the arm. The speed of the arm can be measured by measuring the back electromotive force ($B_{EMF}$) of the motor. In fact, the $B_{EMF}$ produced in the motor by the motion of the arm is proportional to the speed of the arm according to the following relation:

$$BEMF = K_e \cdot \omega = K_e/\text{armlength} \cdot \text{speed}$$

wherein $K_e$ is a constant.

In systems driven in discontinuous mode, the bridge stage driving the motor alternately sets the motor in conduction state and in a high impedance state. So, when the motor is in high impedance state and the current flowing in the motor is equal to zero, the BEMF of the motor can be measured as the voltage drop on the control nodes of the motor.

Known ramp loading systems periodically measure the speed of the read/write head and compare it to the value of the desired speed. Depending on the result of this comparison, the motor is fed with a current pulse of a pre-established amplitude, to correct the speed of the arm. This correction causes the speed of the arm to vary around the desired speed value within a certain interval, whose amplitude ("speed ripple") determines the precision of the regulation. If the current pulse provided to the motor is too strong, the speed variation, and thus the speed ripple, is large, thus allowing only a coarse regulation.

The speed of the arm is not constant but varies around its mean value because of the variability of the friction affecting the arm. A sudden reduction of the friction could make the current pulse provided to the motor overdrive the arm, making the speed of the arm greatly overcome the desired value. On the contrary, an increase of the friction could make the provided current pulse not suitable to have the arm move with the desired speed.

All mentioned drawbacks would be avoided, or greatly reduced, by a ramp loading system able to provide current pulses whose amplitudes vary depending on the difference between the desired speed and the effective speed of the arm. A system for driving a motor providing large current pulses when the speed greatly differs from the desired speed and providing small current pulses when the speed is close to the desired value is needed.

SUMMARY OF THE INVENTION

A method of controlling a motor driving a mechanical arm, and a related circuit, that greatly reduces the speed ripple of the arm is provided. The method of the invention allows very precise control of the speed of the arm, avoiding the above described drawbacks, by feeding the motor with current pulses whose amplitudes are calculated as a function of the absolute difference between the desired speed and the effective speed of the arm, according to a nonlinear relation.

More precisely an object of the present invention is a method of controlling a voice coil motor driving a swinging arm via a control circuit. The control circuit includes means for setting the output nodes, to which the motor is connected for a certain time interval, in a high impedance state, means for detecting the back electromotive force induced on the motor winding during the time interval, and means for delivering current pulses for driving the motor. The method of the invention includes comparing the detected back electromotive force with a certain target value and regulating the amplitude of the driving current pulses as a function of the difference between the detected value of the back electromotive force and a voltage signal representing the desired speed of the arm, according to a pre-established function. A preferred embodiment of the method of the invention includes such a function being a pre-established saturated linear characteristic with offset value.

Another object of the invention is to provide a circuit for controlling a voice coil motor driving a mechanical arm comprising first means for setting control nodes of the motor in a high impedance state or in a conduction state depending on the value of a logic signal, and second means for detecting the back electromotive force of the motor during a high impedance state, for producing a logic signal that indicates whether or not the detected back electromotive force exceeds a voltage signal representing the desired speed of the arm, and for producing a control voltage whose value is calculated as a function of the value of the difference between the back electromotive force and the voltage value representative of the desired speed of the arm, according to a saturated linear characteristic with a certain offset.

Also, the circuit includes a controller coupled to the control nodes of the motor, being input with the logic signal, with a voltage drop across a sensing resistance in series with the motor and with the control voltage, for storing the control voltage when the current flowing in the motor in a high impedance state becomes zero, comparing the stored control voltage with an amplified replica of the voltage drop when the motor is in the successive conduction state, and producing a flag signaling whether the amplified replica exceeds the stored control voltage or not. The enable-disable signal sets the motor in the high impedance state or in the conduction state.

BRIEF DESCRIPTION OF THE DRAWINGS

All advantages of the present invention will be clear in view of the detailed description of several embodiments of the invention and by referring to the attached drawings wherein.

DETAILED DESCRIPTION OF THE PREFERRED EMBODIMENTS

The method of the present invention provides high precision control of the speed of a motor. In particular this invention can be conveniently implemented for controlling the speed of a voice coil motor (VCM) driving a mechanical arm supporting a read/write head of a hard disk drive.

A fine measure of the speed of the arm is necessary for controlling the motor in a reliable manner. As above explained, a signal representative of that speed can be obtained by measuring the back electromotive force ($B_{EMF}$) induced in the motor by the motion of the arm. The $B_{EMF}$ can be obtained in several different ways depending on the mode of operation of the motor. For example, if the motor is being driven in a discontinuous mode, the back electromotive force is equal to the voltage drop on the control nodes of the motor when the current in the motor is zero. Another way of getting the instantaneous value of the $B_{EMF}$ is to calculate it from the values of the voltage drop on the control nodes of the motor and of the current flowing in the coil of the motor.

The present method of controlling the speed of the arm comprises comparing the BEMF with an external voltage value $V_{TARGET}$ representing the desired speed of the arm. Depending on such a comparison, the motor is fed with a current pulse thus making the read/write head move at the desired speed. According to the method of the invention, amplitudes of current pulses are calculated using the transfer characteristic depicted in FIG. 1. On the horizontal axis there is shown the difference ΔV between the $B_{EMF}$ and the voltage VTARGET representative of the desired speed, and on the vertical axis there is shown the amplitude I of the current pulse. The depicted characteristic which is antisymmetrical to the vertical axis, for increasing or decreasing the motion of the arm speed depending on the sign of the difference ΔV, presents an offset value, which is linear for a certain interval and reaches a maximum constant value. Such a characteristic will be referred to in the following description as a saturated linear characteristic with offset value.

A feature of this invention is that amplitudes of the current pulses fed to the motor are not constant, but the greater the difference ΔV is, the greater the amplitude of the current pulse provided to the motor is, until a certain maximum value is reached. If the effective speed greatly differs from the desired value, a greater amplitude current pulse will be fed to the motor to have the arm speed tend more rapidly to the desired value. The method of the invention ensures a small speed ripple, because the motor is input with small amplitude current pulses when the speed of the arm is close to the desired value, allowing a fine regulation.

Figure 2:
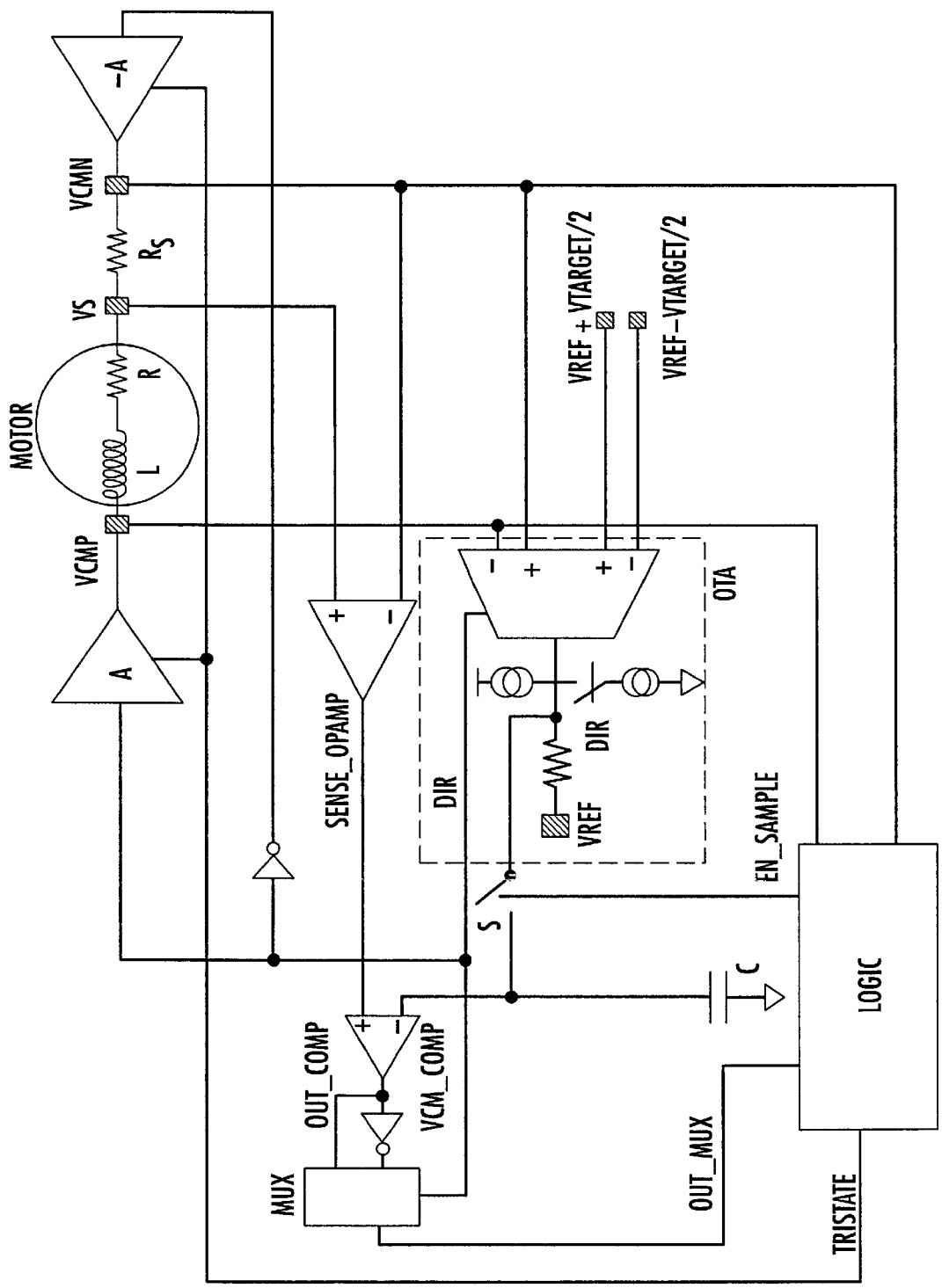
FIG. 2 is a hardware embodiment of the present invention.

A hardware embodiment of the method of the invention is depicted in FIG. 2. The motor is depicted as a series of an inductor L and a resistor R, representing its inductance and resistance, and with a sensing resistance $R_s$.

The drivers A and −A, driven by an enable-disable signal Tristate, set the motor in the conduction state or in the high impedance state. When the motor is set in a high impedance state by the drivers A and −A, the current flowing in it decays to zero with a certain time constant that depends on the circuit parameters of the motor. The block OTA, being input with the $B_{EMF}$ and a voltage $V_{TARGET}$ representative of the desired speed, compares such voltages and outputs a voltage proportional to the amplitude of the current pulse to the input of the motor, calculated as a function of the difference ΔV, according to the characteristic of FIG. 1.

The capacitor C is charged with the voltage output by the OTA through a switch S driven by the read signal EN_SAMPLE signaling that the OTA is input with the BEMF of the motor. The drivers A and −A set the motor in the conduction state making a current flow in it. That current produces on the sensing resistance $R_s$ a voltage drop, that is amplified by an amplifier SENSE_OPAMP and is input to the voltage comparator VCM_COMP. When such an amplified voltage reaches the voltage of C, the flag OUT_COMP, produced by the VCM_COMP, switches. A multiplexer MUX produces a signal OUT_MUX equal to the flag OUT_COMP or to its logic negation, depending on the value of DIR. The multiplexer MUX is necessary to output the signal of the two input signals that presents a rising edge.

The block LOGIC is connected to the control nodes VCMP, VCMN of the motor, and to the output OUT_MUX of the multiplexer and produces the read signal EN_SAMPLE and the enable-disable signal TRISTATE. The enable-disable signal TRISTATE provided to the drivers of the motor by the block LOGIC, can be produced by an internal set-reset flip-flop having its reset input coupled to the output OUT_MUX of the multiplexer and its set input coupled with a set signal internally generated by the block LOGIC when the motor must be set in the conduction state. The reset signal makes the flip-flop command the setting of the motor in a high impedance state, while the set signal, makes the flip-flop command a conduction state of the motor.

The circuit LOGIC produces the read signal EN_SAMPLE after a certain time delay has elapsed from the assertion of the signal TRISTATE. This time delay must be greater than the decay time of the current in the motor, upon setting the motor in a high impedance state. The delay may be programmed by the use of a counter or equivalent means to satisfy such a condition. After the elapsing of the programmed delay, the read signal EN_SAMPLE is presented when the current in the motor has surely decayed to zero. The presence of the read signal EN_SAMPLE times the reading of the output of the block OTA.

Figure 3:
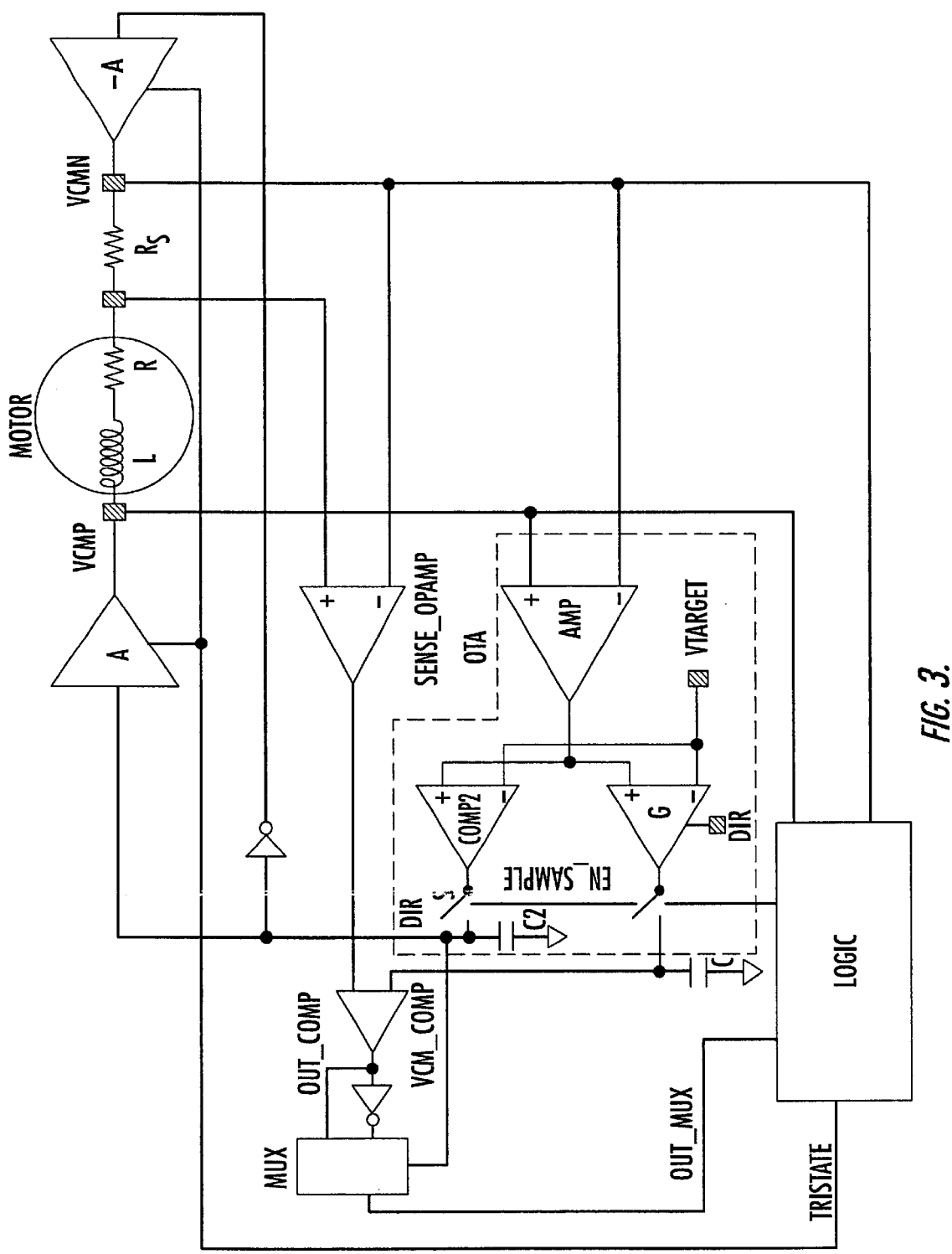
FIG. 3 is another hardware embodiment of the present invention.

A preferred hardware embodiment of the method of the invention is depicted in FIG. 3. This architecture, as the one depicted in FIG. 2, has an amplifier SENSE_OPAMP producing a scaled replica of the voltage drop on a sensing resistance, a voltage comparator VCM_COMP switching its output OUT_COMP when the output of the SENSE_OPAMP exceeds the voltage stored in a capacitor and a multiplexer MUX outputting a signal OUT_MUX equal to OUT_COMP or to its logic negation depending on the value of DIR.

The block OTA includes an amplifier AMP outputting a voltage equal to the voltage drop VCMN-VCMP on the control nodes of the motor, a second comparator COMP2 for the voltage drop VCMN-VCMP and a voltage $V_{TARGET}$ representing the desired speed producing a logic signal DIR, a capacitor C2 storing the logic signal DIR when EN_SAMPLE is produced, and an amplifier G connected in parallel to the second comparator and coupled to the logic value DIR. The signal DIR, indicating whether the voltage drop exceeds $V_{TARGET}$ thus determining the sign of the current to be forced in the motor, assumes a correct value only when the amplifier AMP outputs the BEMF and so when the output of the second comparator COMP2 is stable. For this reason, DIR is sampled when a logic signal EN_SAMPLE is produced, and is stored in a capacitor C2 for providing it when the motor is in the conduction state.

Figure 1:
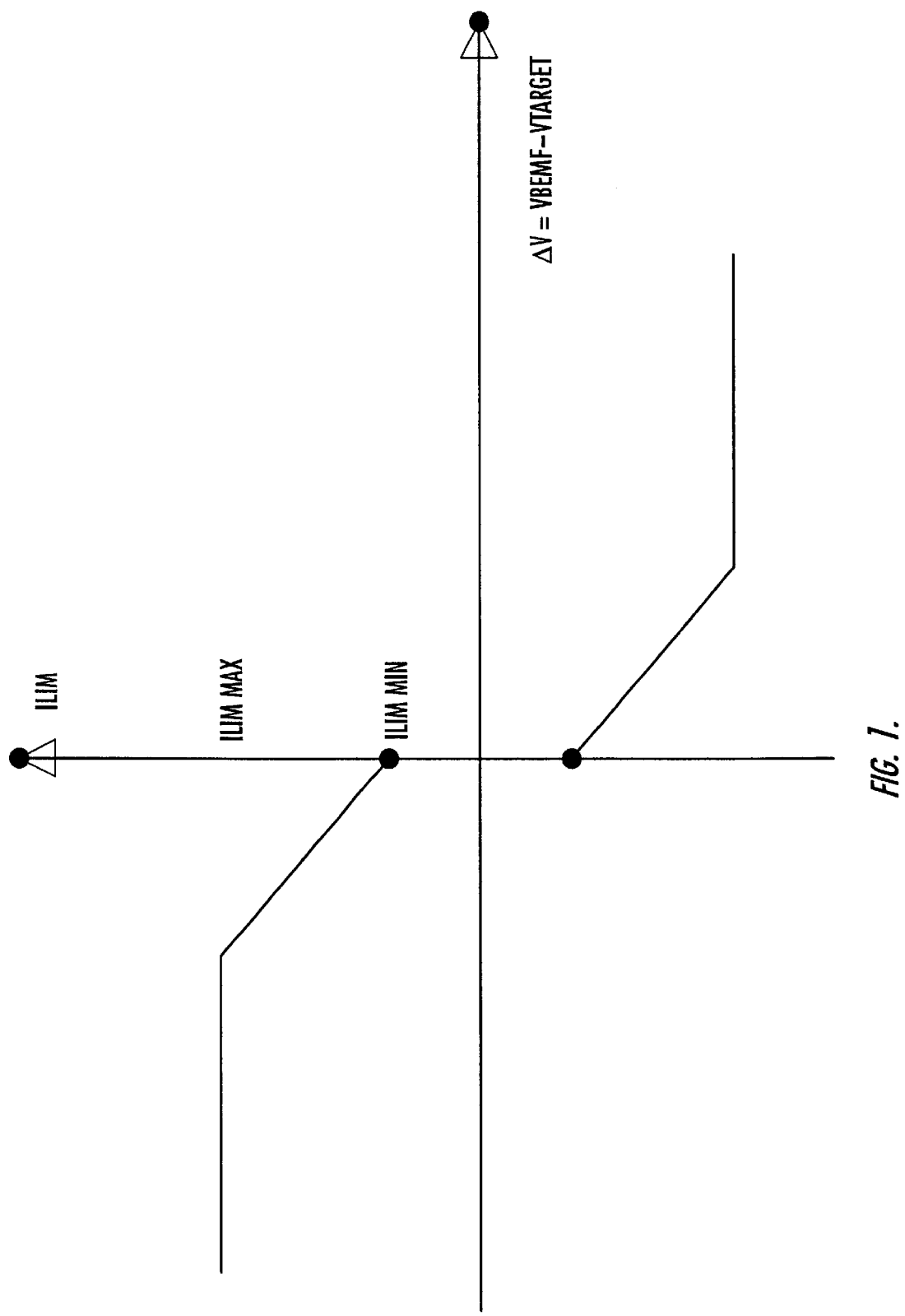
FIG. 1 is graph of an example of saturated linear characteristic with offset value for calculating the current pulse amplitudes in accordance with the present invention.

The amplifier G produces the control voltage (VLIM) representative of the amplitude of the current pulse (I) that must be forced in the motor, according to the transfer function of FIG. 1. The block OTA can even be realized with the architecture depicted in FIG. 4. Such an architecture includes a pair of differential amplifiers AMP1 and AMP2, which are connected in parallel to force in the load, provided by a pair of mirrored transistors M12, M13, a current equal to the sum of the biasing current 2*I and the difference D_I between the unbalancing currents I1 and I2 of the pair of amplifiers AMP1 and AMP2.

Figure 4:
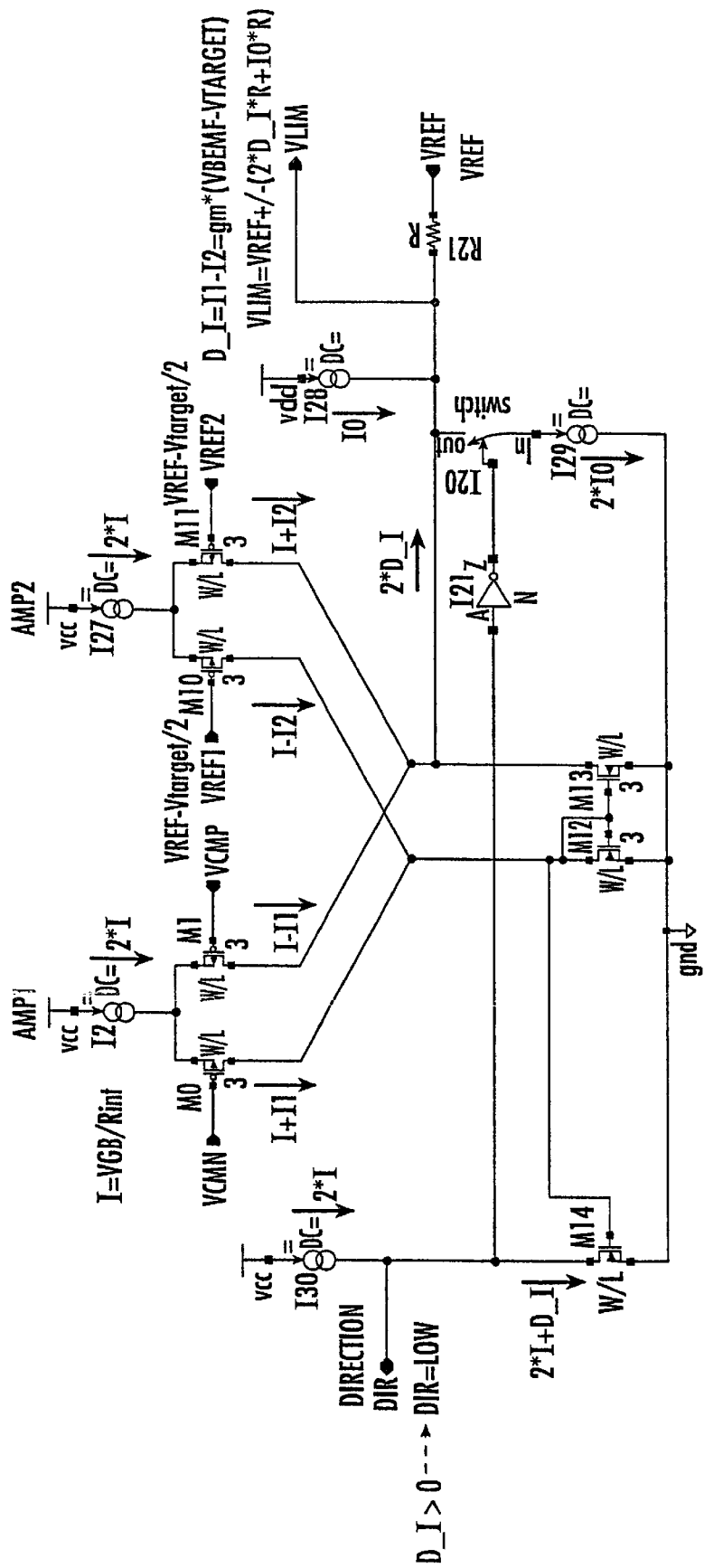
FIG. 4 is an embodiment of the block OTA of FIG. 2.

From a current node of the current mirror M12, M13 not connected to ground, a current equal to 2*D_I flows through a resistance R. The output voltage $V_{LIM}$ charging the capacitor C is taken on the node of R not connected to the reference voltage $V_{REF}$. The voltage-current characteristic of the circuit of FIG. 4 is determined by the saturated linear voltage-current characteristic of the two differential amplifiers AMP1 and AMP2, and a non-null value for $\Delta V$, the offset value, is present because of the current I0 flowing through the resistance R.

The transistor M14 is mirrored to the transistor M12 and thus the current 2*I+D_I flows in it. A current opposite to D_I is sunk via the DIR output, thus indicating the sign of the current to be forced in the motor. In order to have a symmetric characteristic, when the direction of the arm is inverted, also the current producing the offset voltage must be inverted. So the voltage drop on M14 due to D_I is detected and, if the sign of D_I changes, the inverter I21 turns on the switch I20, making an offset current of opposite sign −I0 flow through the resistance R.

That which is claimed:

1. A method of controlling a voice coil motor (VCM) for driving a rotatable arm, via a control circuit which sets output nodes connected to the VCM in a high impedance state for a time interval, detects a back electromotive force ($B_{EMF}$) induced on a winding of the VCM during the time interval, and delivers driving current pulses for the VCM, the method comprising:
   comparing the detected BEMF with a target voltage signal representing a desired speed of the arm; and
   regulating an amplitude of driving current pulses based upon the comparing, according to a saturated linear characteristic with a predetermined offset.

2. A method according to claim 1 wherein the amplitude of the driving current pulses provided to the VCM increases and decreases as a difference between the detected BEMF and the target voltage signal respectively increases and decreases.

3. A method according to claim 2 wherein the amplitude of the driving current pulses provided to the VCM has a predetermined maximum value.

4. A method of controlling a voice coil motor (VCM) for driving a rotatable arm, via a control circuit, the method comprising:
   setting output nodes connected to the VCM in a high impedance state for a time interval;
   detecting a back electromotive force ($B_{EMF}$) induced on a winding of the VCM during the time interval;
   delivering driving current pulses to the VCM;
   comparing the detected BEMF with a target voltage signal representing a desired speed of the arm; and
   regulating an amplitude of the driving current pulses based upon the comparing, according to a saturated linear characteristic with a predetermined offset.

5. A method according to claim 4 wherein the amplitude of the driving current pulses provided to the VCM increases and decreases as a difference between the detected BEMF and the target voltage signal respectively increases and decreases.

6. A method according to claim 5 wherein the amplitude of the driving current pulses provided to the VCM has a predetermined maximum value.

7. A circuit for controlling a voice coil motor (VCM) driving a rotatable arm, the circuit comprising:
   a sensing resistor connected in series with the VCM;
   a first circuit for setting control nodes of the VCM in a high impedance state in response to a disable signal;
   a second circuit for detecting a back electromotive force ($B_{EMF}$) of the VCM during the high impedance state, for producing a logic signal that indicates whether or not the detected BEMF exceeds a target voltage signal representing the desired speed of the arm and for producing a control voltage based upon a difference between the detected BEMF and the target voltage signal according to a saturated linear characteristic with a predetermined offset; and
   a controller connected to the control nodes, the controller receiving the logic signal, a voltage drop on the sensing resistor and the control voltage, for producing a flag signal indicating when an amplified replica of the voltage drop reaches the control voltage and causes the controller to output the disable signal.

8. A circuit according to claim 7 wherein the controller comprises:
   a multiplexer receiving the flag signal and an inverted flag signal, and outputting one of the flag signal and the inverted flag signal depending on a value of the logic signal;
   a logic circuit receiving an output of the multiplexer, producing the disable signal, and generating a read signal after a time delay;
   a capacitor storing the control voltage when the read signal is generated;
   an amplifier connected to the sensing resistor and outputting the amplified replica of the voltage drop; and
   a comparator having a first input connected to an output of the amplifier, a second input connected to the capacitor, and for outputting the flag signal.

9. A circuit according to claim 8 wherein the logic circuit comprises:
   a circuit connected to the control nodes for generating the read signal and for generating a set signal when the VCM must be set in conduction state; and
   a set-reset flip-flop having a set input receiving the set signal and a reset input receiving the flag signal, and for generating the disable signal.

10. A circuit according to claim 7 wherein the second circuit comprises:
    a first amplifier connected to the control nodes of the VCM for outputting a voltage proportional to the voltage drop on the nodes;
    a second amplifier connected to an output of the first amplifier and receiving the voltage signal for generating the logic signal;
    a capacitor storing the logic signal when the read signal is generated; and
    a third amplifier connected to the output of the first amplifier and receiving the voltage signal for generating the control voltage.

11. A circuit according to claim 7 wherein the second circuit comprises:
    a current mirror;
    first and second parallel-connected differential amplifiers connected to a reference potential via the current mirror, the first amplifier being connected to the control nodes of the VCM and the second amplifier being unbalanced with the voltage signal;

a current generator generating a same current biasing the first and second differential amplifiers;

a transistor mirrored to the current mirror, biased by the current generator, connected to the reference potential, and connected to a first output line providing the logic signal;

a resistor receiving a reference voltage, connected to a second output line providing the control voltage, and connected to the current mirror; and a third circuit for biasing the resistor with an offset current of a sign which depends on a positive or negative sign of an unbalancing current of the paralleled differential amplifiers.

12. A circuit according to claim 11 wherein the third circuit comprises:

a first current generator biasing the resistor with the offset current;

a second current generator generating a current greater than the offset current and connected to the resistor; and a switch connected between the resistor and the second current generator, and controlled by the unbalancing current.

13. A circuit for controlling a voice coil motor (VCM) driving a rotatable arm, the VCM having control nodes and a sensing resistor connected in series therewith, the circuit comprising:

a first circuit for setting the control nodes of the VCM in a high impedance state in response to a disable signal;

a second circuit for detecting a back electromotive force ($B_{EMF}$) of the VCM during the high impedance state, for producing a logic signal that indicates whether the detected BEMF exceeds a target voltage signal representing the desired speed of the arm and for producing a control voltage based upon a difference between the detected BEMF and the target voltage signal according to a saturated linear characteristic with a predetermined offset; and a controller connected to the control nodes, the controller receiving the logic signal, a voltage drop on the sensing resistor and the control voltage, to output the disable signal.

14. A circuit according to claim 13 wherein the controller generates a flag signal to cause the controller to output the disable signal when an amplified equivalent of the voltage drop is equal to the control voltage.

15. A circuit according to claim 14 wherein the controller comprises:

a multiplexer receiving the flag signal and an inverted flag signal, and outputting one of the flag signal and the inverted flag signal depending on a value of the logic signal;

a logic circuit receiving an output of the multiplexer, producing the disable signal, and generating a read signal after a time delay;

a capacitor storing the control voltage when the read signal is generated;

an amplifier connected to the sensing resistor and outputting the amplified equivalent of the voltage drop; and a comparator connected to an output of the amplifier and to the capacitor, for outputting the flag signal.

16. A circuit according to claim 15 wherein the logic circuit comprises:

a circuit connected to the control nodes for generating the read signal and for generating a set signal to set the VCM in a conduction state; and a flip-flop receiving the set signal and the flag signal, and for generating the disable signal.

17. A circuit according to claim 13 wherein the second circuit comprises:

a first amplifier connected to the control nodes of the VCM for outputting a voltage proportional to the voltage drop on the nodes;

a second amplifier connected to an output of the first amplifier and receiving the voltage signal for generating the logic signal;

a capacitor storing the logic signal when the read signal is generated; and a third amplifier connected to the output of the first amplifier and receiving the voltage signal for generating the control voltage.

18. A disk drive comprising:

a disk;

a read/write head;

an actuator arm carrying the read/write head;

a voice coil motor (VCM) for driving the actuator arm to load and unload the read/write head onto the disk, the VCM having control nodes and a sensing resistor connected in series therewith; and a circuit for controlling the VCM and comprising a first circuit for setting the control nodes of the VCM in a high impedance state in response to a disable signal, a second circuit for detecting a back electromotive force ($B_{EMF}$) of the VCM during the high impedance state, for producing a logic signal that indicates whether the detected BEMF exceeds a target voltage signal representing the desired speed of the arm, and for producing a control voltage based upon a difference between the detected BEMF and the target voltage signal according to a saturated linear characteristic with a predetermined offset, and a controller connected to the control nodes, the controller receiving the logic signal, a voltage drop on the sensing resistor and the control voltage, to output the disable signal.

19. A disk drive according to claim 18 wherein the controller generates a flag signal to cause the controller to output the disable signal when an amplified equivalent of the voltage drop is equal to the control voltage.

20. A disk drive according to claim 19 wherein the controller comprises:

a multiplexer receiving the flag signal and an inverted flag signal, and outputting one of the flag signal and the inverted flag signal depending on a value of the logic signal;

a logic circuit receiving an output of the multiplexer, producing the disable signal, and generating a read signal after a time delay;

a capacitor storing the control voltage when the read signal is generated;

an amplifier connected to the sensing resistor and outputting the amplified equivalent of the voltage drop; and a comparator connected to an output of the amplifier and to the capacitor, for outputting the flag signal.

21. A disk drive according to claim 20 wherein the logic circuit comprises:

a circuit connected to the control nodes for generating the read signal and for generating a set signal to set the VCM in a conduction state; and a flip-flop receiving the set signal and the flag signal, and for generating the disable signal.

22. A disk drive according to claim 18 wherein the second circuit comprises:

a first amplifier connected to the control nodes of the VCM for outputting a voltage proportional to the voltage drop on the nodes;

a second amplifier connected to an output of the first amplifier and receiving the voltage signal for generating the logic signal;

a capacitor storing the logic signal when the read signal is generated; and a third amplifier connected to the output of the first amplifier and receiving the voltage signal for generating the control voltage.

* * * * *

UNITED STATES PATENT AND TRADEMARK OFFICE
CERTIFICATE OF CORRECTION

PATENT NO.    : 6,392,375 B1                                                          Page 1 of 1
DATED         : May 21, 2002
INVENTOR(S)   : Salvatore Portaluri, Alessandro Savo, Luigi Eugenio Garbelli, Giuseppe Luciano and
                Luca Schillaci It is certified that error appears in the above-identified patent and that said Letters Patent is
hereby corrected as shown below:

Title page,
Item [73], delete "StMicroelectronics S.R.L." insert -- STMicroelectronics S.r.l. --

Drawings,
Delete "FIG. 4" insert -- new FIG. 4 --

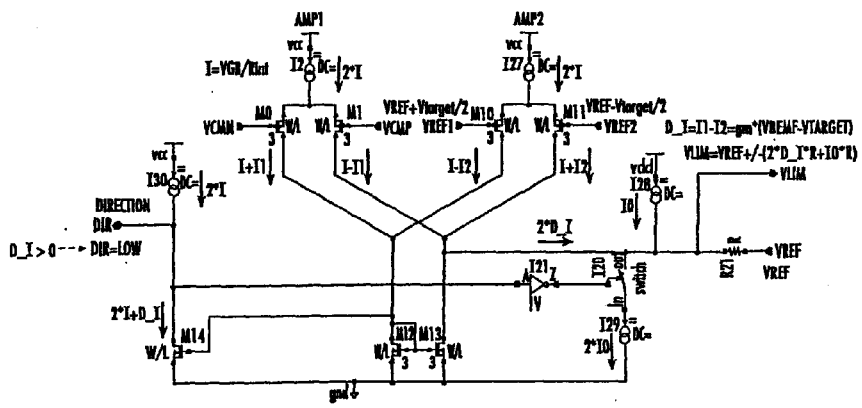

Column 2,
Line 61, delete "FIG. 1 is graph of an example of saturated" insert
-- FIG. 1 is a graph of an example of a saturated --

Signed and Sealed this

Twelfth Day of November, 2002

Attest:

JAMES E. ROGAN
Attesting Officer          Director of the United States Patent and Trademark Office